(No Model.)
J. B. WATT.
ADJUSTABLE WHEEL TIRE.
No. 565,398. Patented Aug. 4, 1896.
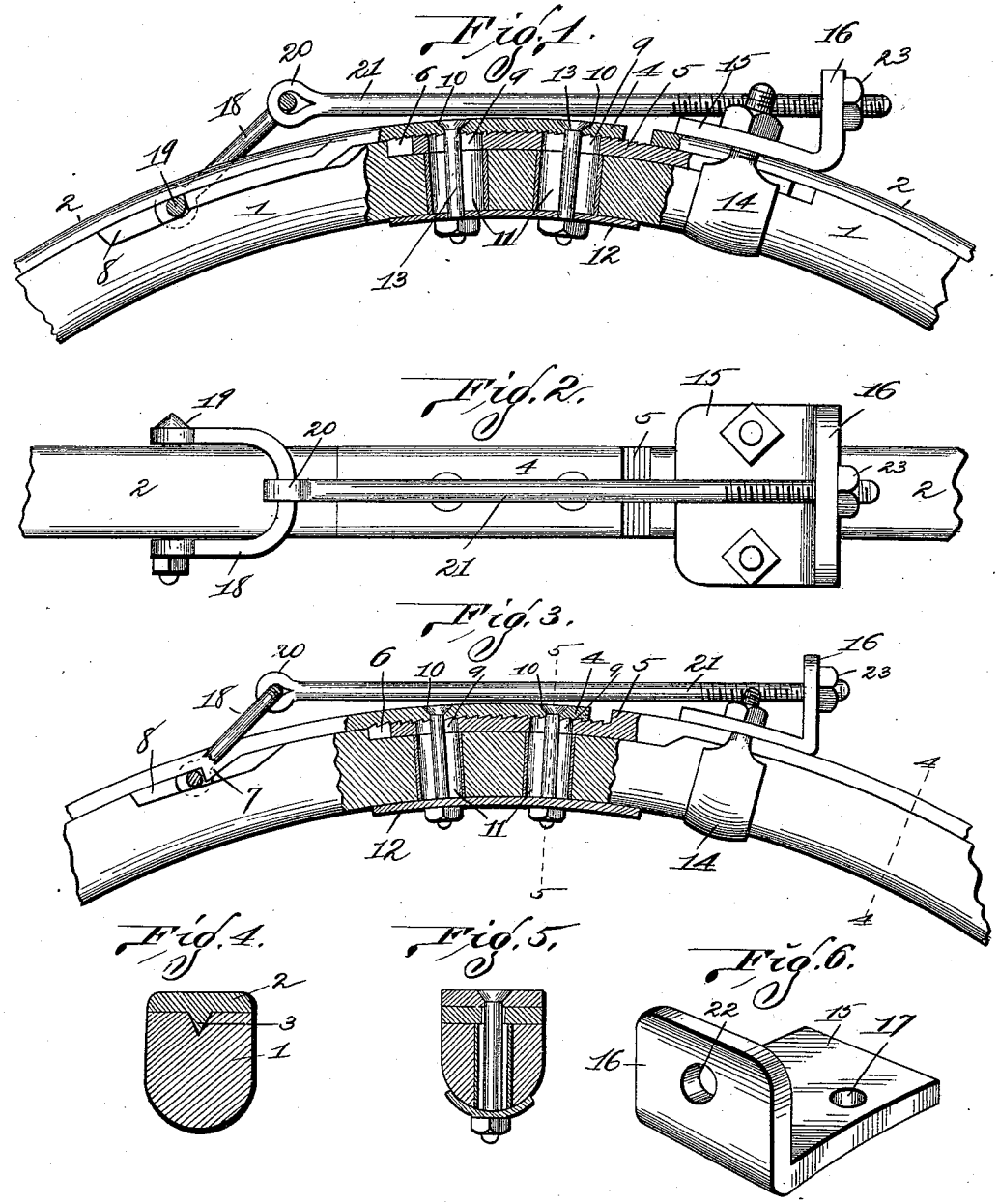
Attest
W. Smith
S. G. Wells
Inventor:—
James B. Watt.
By Higdon & Higdon & Longan
Att'ys

UNITED STATES PATENT OFFICE.

JAMES B. WATT, OF EDWARDSVILLE, ILLINOIS.

ADJUSTABLE WHEEL-TIRE.

SPECIFICATION forming part of Letters Patent No. 565,398, dated August 4, 1896.

Application filed March 23, 1896. Serial No. 584,454. (No model.)

*To all whom it may concern:*

Be it known that I, JAMES B. WATT, of the city of Edwardsville, Madison county, State of Illinois, have invented certain new and useful Improvements in Adjustable Wheel-Tires, of which the following is a full, clear, and exact description, reference being had to the accompanying drawings, forming a part hereof.

My invention relates to an adjustable tire and mechanism for tightening the same; and it consists in the novel construction, combination, and arrangement of parts hereinafter described and claimed.

In the drawings, Figure 1 is a side elevation of a segment or a rim of a wheel, partly in section, showing the means of connecting the meeting ends of my adjustable tire and my improved mechanism for tightening said tire. Fig. 2 is a top plan view of the parts shown in Fig. 1. Fig. 3 is a modified form of the parts shown in Fig. 1. Fig. 4 is a cross-section on the line 4 4 of Fig. 3. Fig. 5 is a cross-section on the line 5 5 of Fig. 3. Fig. 6 is a perspective of a plate of which I make use.

Referring by numerals to the drawings, 1 is the felly or rim of the wheel, and 2 is the tire. The rim 1 has a V-shaped recess in cross-section in which the annular lug 3 of the tire is positioned, as shown in Fig. 4. The ends of the tire 1 overlap, and the meeting faces 4 and 5 have ratchet-teeth or serrations pointing toward each other for the purpose of hooking said ends together. The rim or felly 1, adjacent these overlapping ends, is horizontally recessed, 6, in cross-section to form a seat for the inner one 5 of said overlapping ends of the tire 2. Near the end 4 of the tire 2 is an inwardly-projecting lug 7, and adjacent said lug is a recess 8 in the rim 1 of such a size as to allow of peripheral motion of the lug 7 relative to the rim 1. In the end 5 of the tire 2 are elongated apertures or bolt-holes 9, and in the end 4 are the countersunk bolt-holes 10.

Fig. 1 shows the construction where an old wheel and an old tire are fitted up with my invention, and Fig. 2 shows a new wheel constructed according to my invention. In Fig. 1 the old tire is cut and the new ends 4 and 5 are riveted to old tire. In Fig. 3 the ends 4 and 5 are formed integral.

Adjacent the elongated apertures 9 are similar apertures 11 in the rim 1, and a curved plate 12 is placed upon the inner face of said rim, said plate having apertures in alinement with the apertures 9, 10, and 11. Bolts 13 are inserted in said alined apertures and are fastened by nuts.

The tire 2 is cut the proper length and placed around the wheel with the lug 3 in position in the annular recess of the rim 1 and the lug 7 in position in the recess 8 and the end 5 in the recess 6. The bolts 13 are then placed in position and the nuts placed loosely thereon. The tire 2 is then in position to be tightened.

A clip 14 is placed astride the rim 1 with its screw-threaded ends projecting outwardly on each side of the tire 2 and near the end 5. The plate 15, having the outwardly-projecting arm 16 and apertures 17, is placed transversely of the tire with the screw-threaded ends of the clip 14 inserted through said apertures 17, and nuts are then placed upon said clip.

A clevis 18 is placed astride the tire 2, adjacent the end 4, and the clevis-pin 19 is inserted through the recess 8 and against the lug 7. Before being placed in position upon the wheel the clevis 18 is inserted through the eye 20 of the rod 21. The screw-threaded end of the rod 21 is inserted in the aperture 22 of the arm 16 and a nut 23 is placed thereon.

In order to tighten the tire, the nut 23 is operated to draw the rod 21 through the aperture 22, thus pulling the end 5 toward the clip 14 and causing the ratchet-teeth on the faces of the ends 4 and 5 to slip by each other. When the tire has been sufficiently tightened, the nuts on the bolts 13 are tightened, causing said teeth on the ends 4 and 5 of the tire to firmly engage each other and hold the tire firmly in position. Then the clip 14 and the clevis 18 may be removed and the wheel is ready to run. The teeth on the ends 4 and 5, held together by the bolt, will keep the tire tight and the lug 3 in the annular recess of the rim will hold the tire from slipping off of the rim.

I claim—

1. In an adjustable tire, a recess encircling the wheel and in the outer face of the rim, a lug on the inner face of the tire to operate in said recess, a tire encircling the rim and having its ends overlapped, the contacting faces of said overlapping ends being serrated, a recess in the rim of the wheel in which to seat the lower one of the overlapping ends of the tire, a lug on the inner face of the tire and transversely thereof near the inner end of the upper serrated end of the tire, a recess in the rim of the wheel in which said lug operates, a clevis placed with its pin through said recess, a clip having an upwardly-projecting arm fixed to and surrounding the rim and tire near the under one of said overlapping ends, a rod attached to said clevis and extending through the aperture in said upwardly-projecting arm, and a nut on the end of said rod whereby the tire may be tightened by the operation of the nut, substantially as stated.

2. In an adjustable tire, a recess encircling the wheel and in the outer face of the rim, a lug on the inner face of the tire to operate in said recess, a tire encircling the rim and having its ends overlapped, the contacting faces of said overlapping ends being serrated, a recess in the rim of the wheel in which to seat the lower one of the overlapping ends of the tire, a lug on the inner face of the tire and transversely thereof near the inner end of the upper serrated end of the tire, a recess in the rim of the wheel in which said lug operates, a clevis placed with its pin through said recess, a clip having an upwardly-projecting arm fixed to and surrounding the rim and tire near the under one of said overlapping ends, a rod attached to said clevis and extending through the aperture in said upwardly-projecting arm, a nut on the end of said rod whereby the tire may be tightened by the operation of the nut, and means of holding said serrated faces together after the tire has been tightened, substantially as stated.

3. In an adjustable tire, a recess encircling the wheel and in the outer face of the rim, a lug on the inner face of the tire to operate in said recess, a tire encircling the rim and having its ends overlapped, the contacting faces of said overlapping ends being serrated, a recess in the rim of the wheel in which to seat the lower one of the overlapping ends of the tire, a lug on the inner face of the tire and transversely thereof near the inner end of the upper serrated end of the tire, a recess in the rim of the wheel in which said lug operates, a clevis placed with its pin through said recess, a clip having an upwardly-projecting arm fixed to and surrounding the rim and tire near the under one of said overlapping ends, a rod attached to said clevis and extending through the aperture in said upwardly-projecting arm, a nut on the end of said rod whereby the tire may be tightened by the operation of the nut, elongated apertures in the lower one of the overlapping ends of the tire, apertures in the upper one of the overlapping ends of the tire and in alinement with the first said apertures, elongated apertures in the rim of the wheel and in alinement with the first said apertures, a plate on the inner face of the rim of the wheel having apertures in alinement with all of the aforesaid apertures, and bolts penetrating all of said apertures whereby the serrated faces of said overlapping ends are firmly held together after the tire has been tightened, substantially as stated.

In testimony whereof I affix my signature in presence of two witnesses.

JAMES B. WATT.

Witnesses:
EDWARD E. LONGAN,
S. G. WELLS.